United States Patent
Lv

(10) Patent No.: US 7,767,601 B2
(45) Date of Patent: Aug. 3, 2010

(54) SHELL-TYPE REACTOR WITH RADIAL BAFFLES

(76) Inventor: Zhongming Lv, 206 Xinhua Road, Dachang, Nanjing (CN)

(*) Notice: Subject to any disclaimer, the term of this patent is extended or adjusted under 35 U.S.C. 154(b) by 445 days.

(21) Appl. No.: 11/858,415

(22) Filed: Sep. 20, 2007

(65) Prior Publication Data
US 2008/0075642 A1 Mar. 27, 2008

(30) Foreign Application Priority Data
Sep. 27, 2006 (CN) .................. 2006 2 0077859 U

(51) Int. Cl.
F23D 7/00 (2006.01)
B01J 8/02 (2006.01)
B01J 35/02 (2006.01)
B01J 19/00 (2006.01)
B01J 19/18 (2006.01)

(52) U.S. Cl. ............... 442/201; 422/129; 422/200; 422/198; 422/218; 422/228

(58) Field of Classification Search .......... 422/218, 422/228, 201, 129, 200, 198
See application file for complete search history.

(56) References Cited

U.S. PATENT DOCUMENTS 4,594,227 A * 6/1986 Ohsaki et al. ............ 422/148
6,230,791 B1 * 5/2001 Van Dine et al. ........... 165/80.4
6,772,830 B1 * 8/2004 Larsen et al. .............. 165/151

* cited by examiner

Primary Examiner—Walter D Griffin
Assistant Examiner—Natasha Young
(74) Attorney, Agent, or Firm—Global IP Services; Tianhua Gu

(57) ABSTRACT

The object of the present utility model is to cope with the problems of large volume of the presently known cellpacking type of reactor and the poor effect of heat transfer, and to provide a shell-type reactor with radial baffle, which transfers heat well and reduce the volume of the reactor, comprising a shell (1) and an internal cold plate assembly (2), the internal cold plate assembly (2) fixed within the shell (1); wherein a gas radial distribution vessel (9) and a radial gas cylinder (10) fixed within the shell (1); the radial distribution vessel (9) and the radial gas cylinder (10) could counterchange according to the difference of the gas flow direction; several circles of radial baffling assemblies (12) are provided between the radial distribution vessel (9) and the radial gas cylinder (10), the radial baffling assemblies (12) consisting of several baffling components fixed in an interval mode, an axial baffling through groove or hole is provided between the adjacent baffling components. The present utility model has advantages of the great effect of heat transfer, the simple structure, the small overall size.

5 Claims, 6 Drawing Sheets

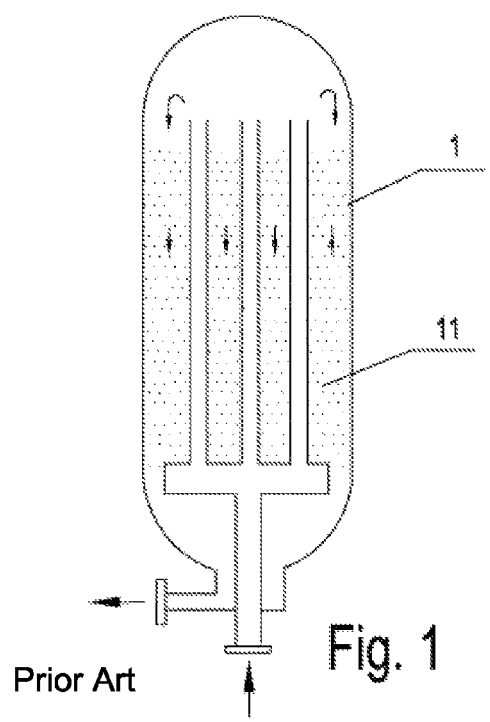
Prior Art  Fig. 1
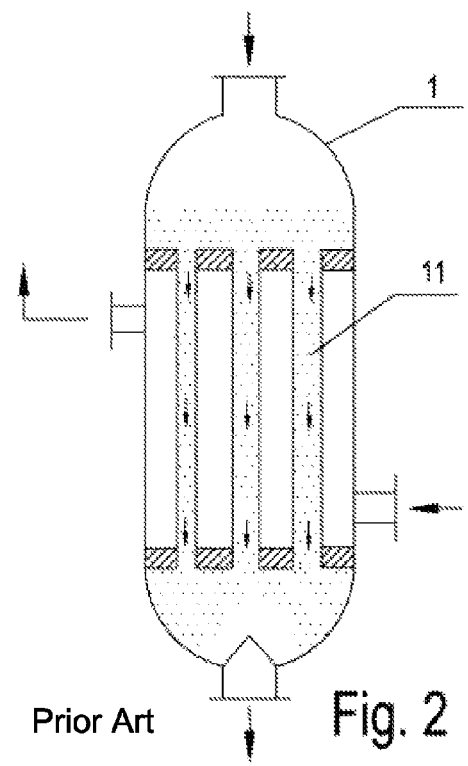
Prior Art  Fig. 2
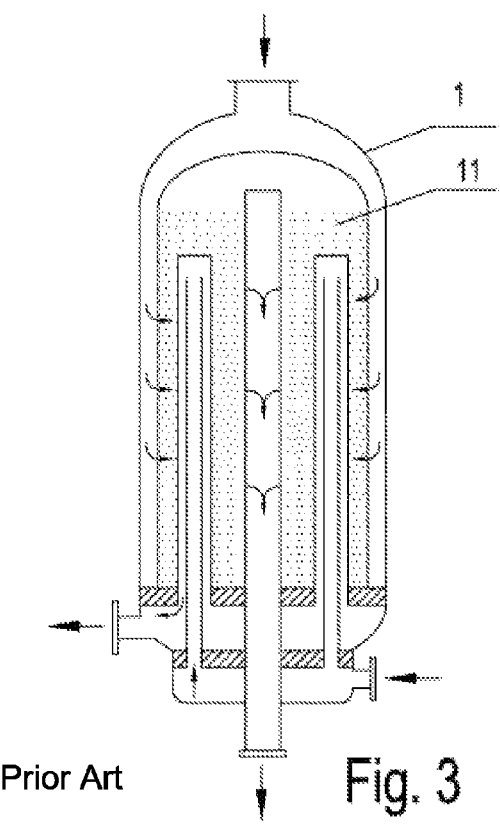
Prior Art  Fig. 3
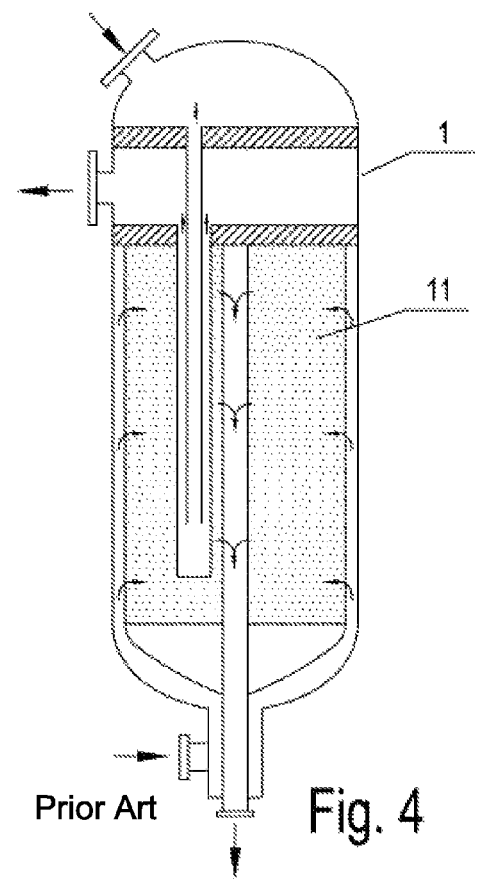
Prior Art  Fig. 4

SHELL-TYPE REACTOR WITH RADIAL BAFFLES

CROSS REFERENCE TO RELATED PATENT APPLICATION

This patent application claims the priority of the Chinese patent application No. 200620077859.3 with a filing date of Sep. 27, 2006.

FIELD OF THE INVENTION

The present utility model relates to a shell-type reactor, especially relates to a lamella reactor with the baffling cold plate employed in a gas-solid catalytic reaction bed to transfer heat, and specifically relates to a shell-type reactor with radial baffles.

BACKGROUND OF THE INVENTION

FIG. 1 shows the presently known catalytic reactor with fixed bed. In this catalytic reactor, the heat transfer of the chemical heat released is carried out by the heat transfer element with the cooling tubes, and the coolant is usually cool reacting gas. But the catalyst bed out of the tubes usually employs an axial flow bed layer, the major disadvantages of this reactor are as follow:

(1) The gas cooling tubes have the characteristic with poor efficiency of heat transfer and finite quantity of heat transfer, and the temperature distribution of the catalyst bed layer is not perfect.

(2) The axial-flow resistance is great and the production capacity is restricted.

To intensify the heat transfer capacity of the reactor and improve the temperature distribution of the catalyst bed layer, the cellpacking type of the water cooling reactor (Referring to FIG. 2) is developed zealously in the last 20 years. And obtain some favorable effect, but still many obvious disadvantages are as follow:

(1) The resistance (of the catalyst) in the tubes is so great that it need to increase the number of the tubes and the diameter of the reactor.

(2) The reactors require the better material nature and the thick tube plate with a major diameter, and the manufacture hardness is too great. So it costs much.

(3) The utilization ratio of the catalyst loaded in the reactors is poor and the diameter of catalyst loaded in the reactors is large, and it badly limits the large-scale level of the uniserial production capacity. For example, when the industrial scale increases to the 200,000 ton, the diameter of the reactors for the production of methanol is about 4 m, and the ratio of its high-diameter is always 1-2.5. And it also increases the hardness of its transportation and its fixing.

According to these disadvantages, it develops the cellpacking type of the water-cooling reactor with radial flow in these years to solve the problem of the large resistance (FIGS. 3 and 4). Finally, the reactor resistance is reduced from 0.5 MP to 0.1 MPa, and the ratio of the high-diameter is also increased to 3-8.

Although the cellpacking type of reactor with radial flow solves the problem of resistance, it also causes other problems as follow:

(1) The low resistance of the radial flow causes the oversize vent section, the short flow path, and the extraordinary smallness of the velocity of flow. And it causes the coefficient of heat supplied in the catalyst side out of tubes excessively low, which is only $\frac{1}{5}$-$\frac{1}{20}$ of the normal value of the axial flow. So the heat transfer efficiency falls down, the quantity of heat is hard to carry away, and part of the catalyst is easy to overheat.

(2) Employing the thick tube plate with a major diameter cannot get rid of the disadvantages of the high cost and the large manufacture hardness.

(3) The loading and unloading of catalyst is difficult.

(4) Because of the low heat transfer efficiency, it requires more cooling tubes. So the availability ratio of the high pressure space is even lower than that of the cellpacking type of the reactor with axial flow.

SUMMARY OF THE INVENTION

The object of the present utility model is to cope with the problems of the large volume of the presently known cellpacking type of reactor and the poor effect of heat transfer, and to provide a shell-type reactor with radial baffles, which transfers heat well and reduces the volume of the reactor.

The technical program of the present utility model is as follow:

A shell-type reactor with radial baffles, comprising a shell 1 and an internal cold plate assembly 2, said internal cold plate assembly 2 fixed within said shell 1; wherein a gas radial distribution vessel 9 and a radial gas cylinder 10 fixed within said shell 1; said radial distribution vessel 9 and said radial gas cylinder 10 may counterchange according to the difference of the gas flow direction; several circles of radial baffling assemblies 12 are provided between said radial distribution vessel 9 and said radial gas cylinder 10, said radial baffling assemblies 12 consisting of several baffling components fixed in an interval mode, an axial baffling through groove or hole is provided between the adjacent baffling components.

Said baffling components employ the structure of hollow cold plates; said baffling components employ the structure of hollow cavity, or the structure of cold plates which are full of water or other coolant.

Said baffling components employ the structure consisting of the solid fixed plates and the axial array tubes which are inseparate from said solid fixed plates, or the structure consisting of the solid fixed plates and the tubes which are separate from said solid fixed plates, while the solid fixed plate guides reacting gas through the axial baffling through groove or hole in order to prevent the reacting gas from passing through the adjacent pipes The section of said radial baffling assemblies 12 employs a circle-arc structure, a polygonal line structure or a cylindrical structure.

The cylindrical structure of the radial baffling assemblies 12 is provided between said radial distribution vessel (9) and the radial gas cylinder (10); it has several coaxial cylindrical baffling components having through holes or grooves distributed on their column faces.

Radial through holes fixing on said radial distribution vessel 9 and said radial gas cylinder 10. The radial through holes are stagger with the through holes or grooves distributed on their column faces.

The through holes or grooves distributed on two adjacent cylindrical baffling components are staggered.

The advantages of the present utility model are as follow:

(1) The present utility model employs the plate cooling element instead of the tube-type water cooling element, and develops the reactor from the presently known cellpacking type to the lamella type. With the same heat transfer surface, the space which the plate cooling element occupies is less than that of tube-type cooling element. So the space availability ratio of the board shell-type reactor is greater than that of cellpacking type reactor, and it may usually increase 5-15%.

(2) In the present utility model, baffle can increase the supplying heat coefficient of the gaseous phase effectively.

In all of the catalytic bed with the radial flow cold plate or the cool tube before the present utility model, although it has the advantage of the minimizing resistance by employing the oversize section of radial flow passage, the short flow passage and the low velocities, it leads to the low supplying heat coefficient of the gaseous phase even lower than 200 kcal/$m^2$.c.h. So the poor heat-transfer intensity of this type of reactor cannot be solved well. In the present utility model, it effectively increases the supplying heat coefficient as high as 500-2000 kcal/$m^2$.c.h, by masterly arranging cold plate for the baffling flow, reducing the aeration section and increasing the length of the passage.

(3) The present utility model can effectively improve the heat-transfer characteristic of the catalytic bed. The gas flow rate in the radial catalytic bed changes along with the direction of radius, which means that the gas flow rate reduces when R increases. And the heat-transfer coefficient which relates to the gas flow rate also reduces when R increases, but the reaction heat increases along with the R's increasing. So the heat transfer and the exothermic character of the type of pure radial reactor cannot be synchronizing. The present utility model overcomes this disadvantage. Employing the design with baffling flowing can make the flow rate of any passage equal and divide each unit length of the catalyst quantity equal, so it can effectively overcome the disadvantage of the presently known radial catalytic beds. In addition, the baffling cold plate of the present utility model can also be designed as the nonequideistant structure, to make the area of the unit cold plate in the different reaction process and the heat-transfer quantity which changes along with the reaction realizes completeness synchronizing and then achieves the real optimization.

(4) The present utility model employs the novelty structure combining the radial flow distribution and the baffling cold plate. The radial flow distributor has the maximal advantage of the low fluid resistance, and it employs baffling in the catalyst bed layer. So its fluid resistance which is mostly 0.1-0.3 MPA is between the pure radial flow resistance (Usually 0.05-0.2 MPa) and the axial flow resistance (usually 0.3-0.8 MPa).

(5) The present utility model no longer employs the thick tube plate with a major diameter, so the manufacture hardness and the cost reduce. And the high-diameter ratio can be 5-8 (the high-diameter ratio of the normal axial flow of the cell-packing type of reactor is 2-4). So the diameter of the reactor which employs this technology is ½-¼ less than that of other reactor with the same production capacity, which is still in favor of the transport and the large scale tendency.

BRIEF DESCRIPTION OF THE DRAWINGS

FIG. 1 is the abridged general view of the presently known fixed bed catalytic reactor.

FIG. 2 is the abridged general view of the presently known cellpacking type of water cooling reactor.

FIG. 3 is the first of the abridged general views of the presently known cellpacking type of water-cooling reactor with radial flow.

FIG. 4 is the second of the abridged general views of the presently known cellpacking type of water-cooling reactor with radial flow.

DETAILED DESCRIPTION OF THE INVENTION

The present utility model is further described by combining with the drawings and the embodiments.

Figure 5:
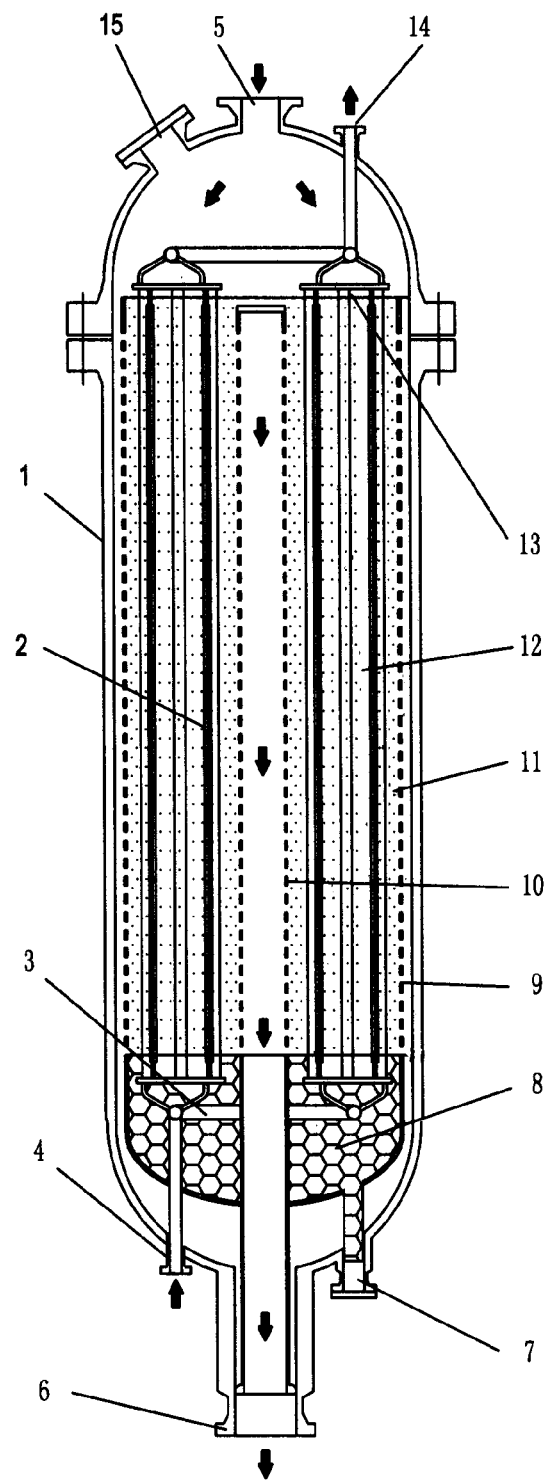
FIG. 5 is the abridged general view of the present utility model.
Figure 6:
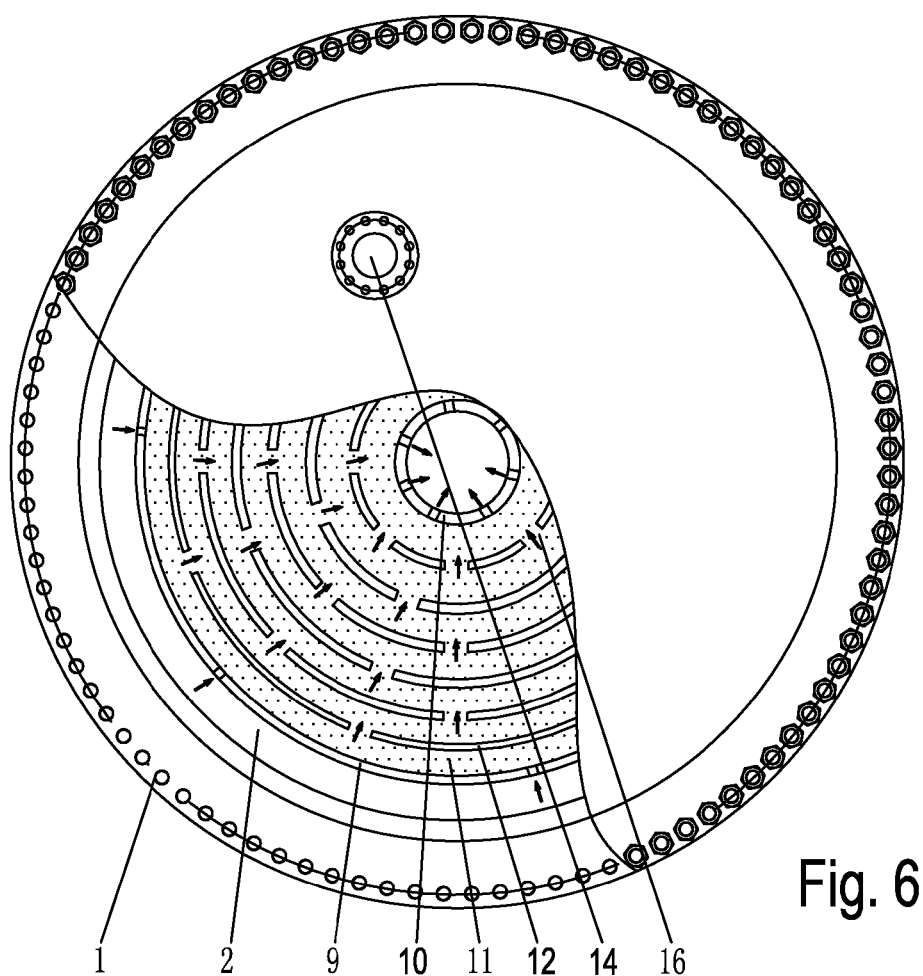
FIG. 6 is the top view of FIG. 5.

Refer to FIG. 5.

Figure 8:
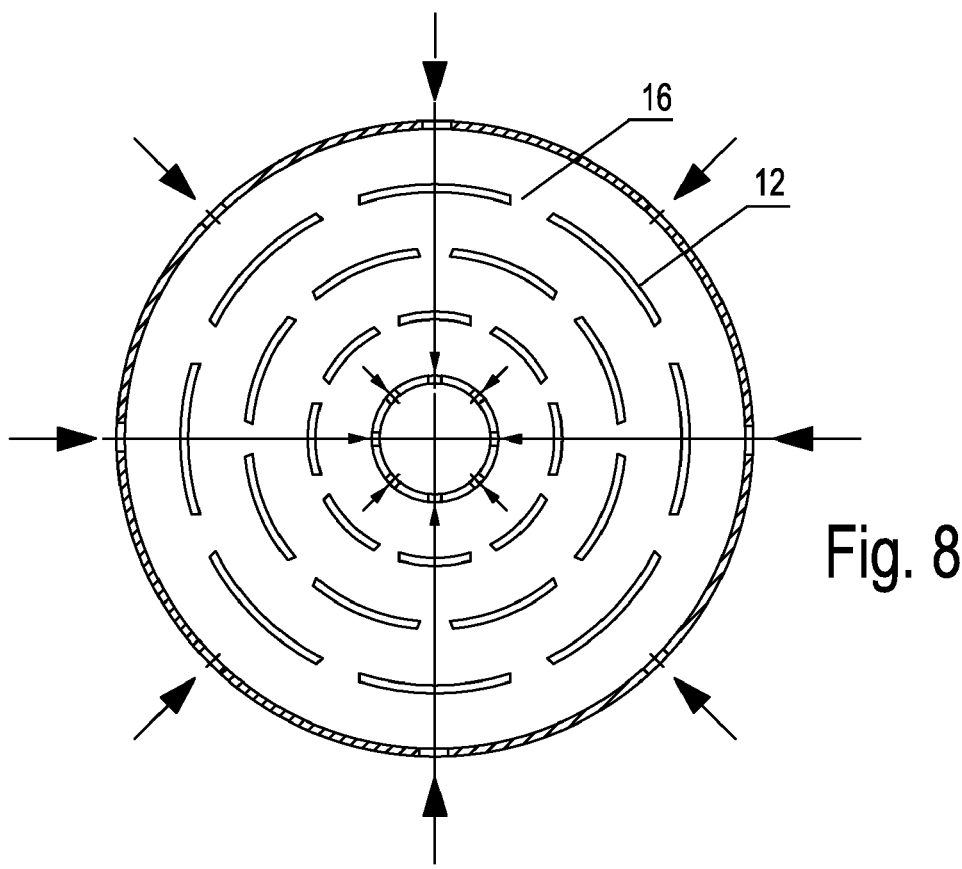
FIG. 8 is the first one of the abridged general views of baffle in the present utility model
Figure 9:
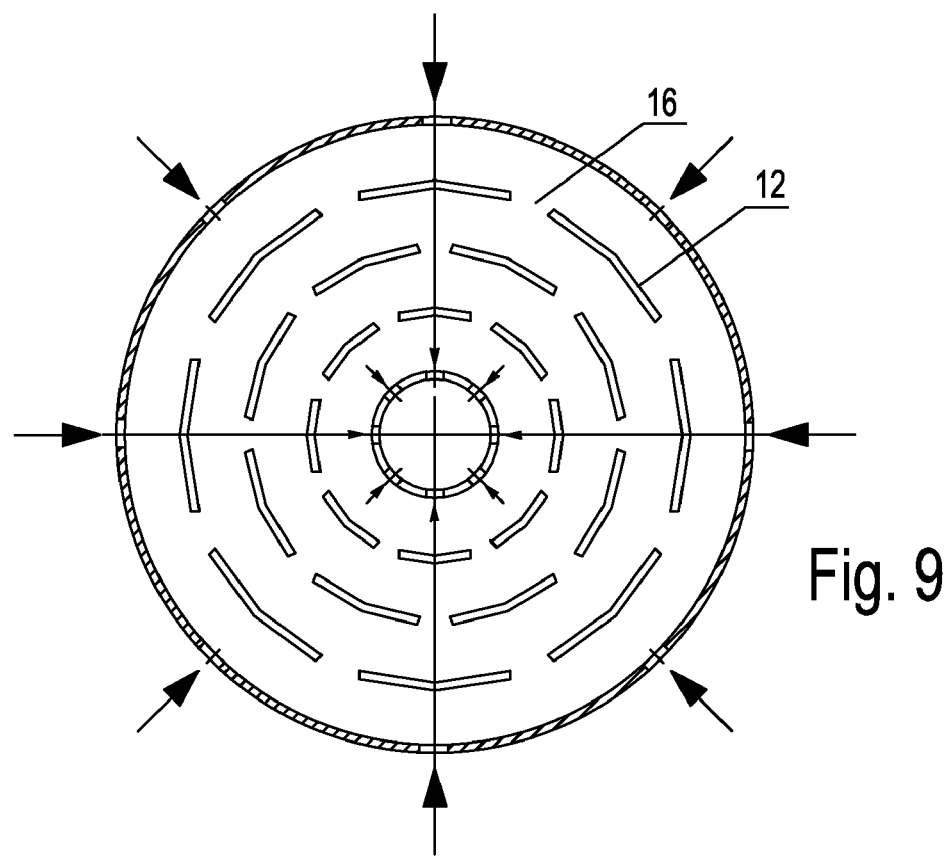
FIG. 9 is the second one of the abridged general views of baffle in the present utility model.
Figure 10:
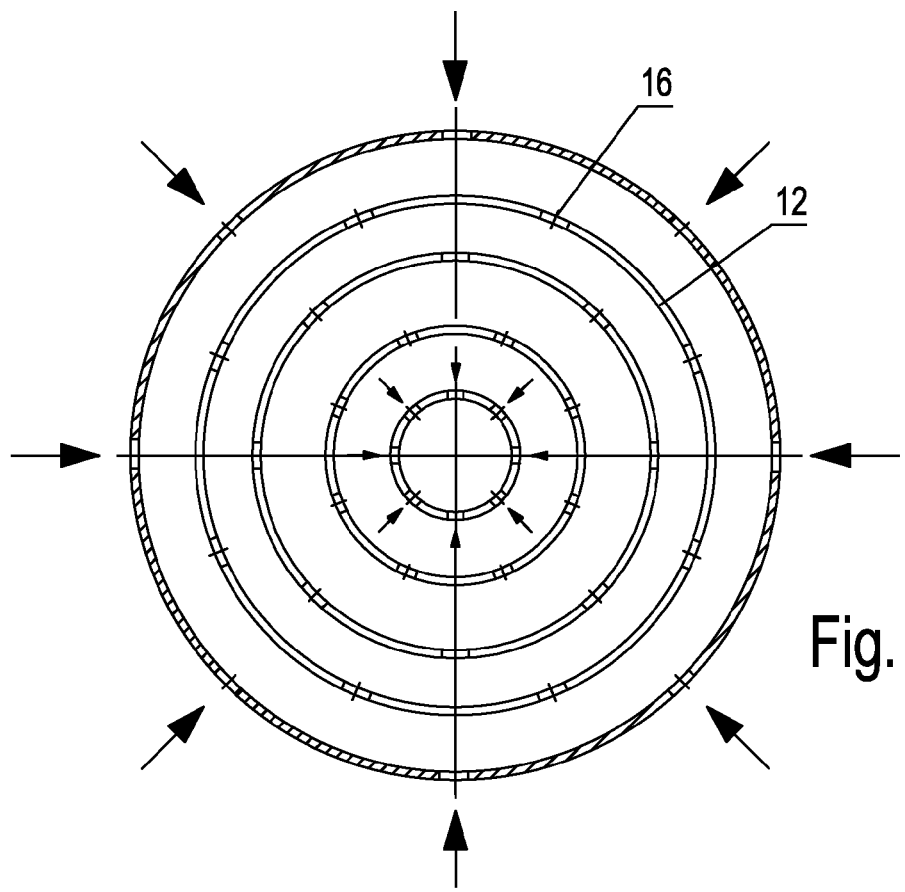
FIG. 10 is the third one of the abridged general views of baffle in the present utility model.
Figure 11:
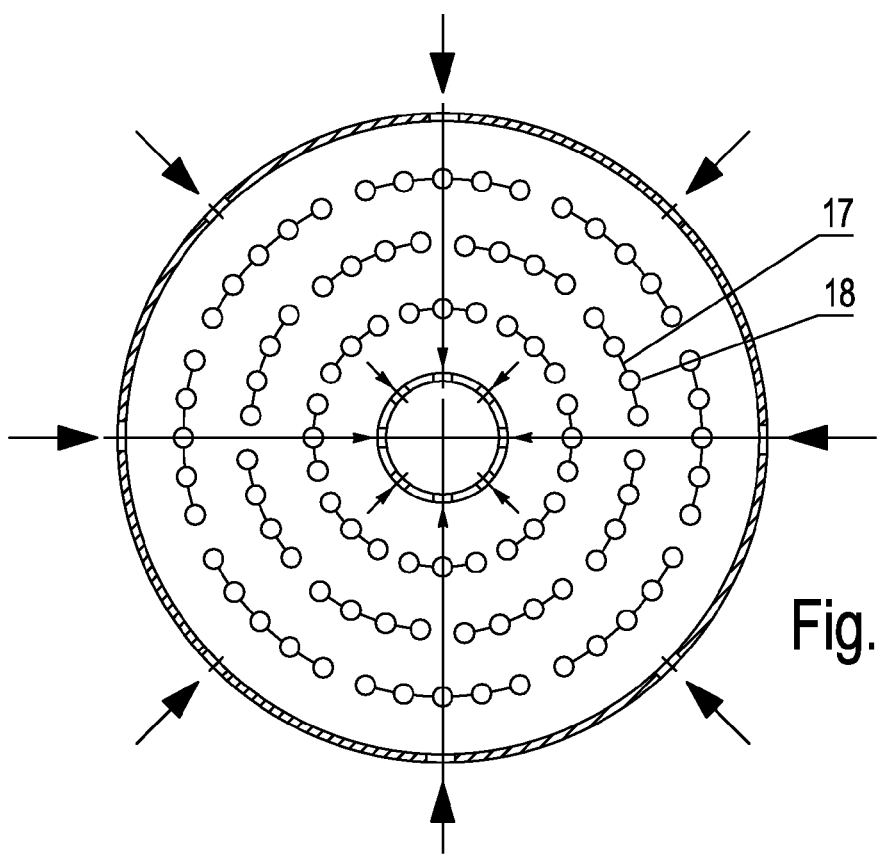
FIG. 11 is the fourth one of the abridged general views of baffle in the present utility model.

A gasses shell-type reactor with radial baffles, mostly consists of an internal cold plate assembly 2, a header 3, the soft water inlet tube 4, a gas inlet 5, a gas outlet 6, a catalyst self-discharge opening 7, an inert filler 8, a gas radial distribution vessel 9, a radial gas cylinder 10, the catalyst 11, the radial baffling assemblies 12, a tail tube 13, a vapor outlet tube 14 and a manhole 15. Referring to FIG. 5, the manhole 15 is located on the top of shell 1, the internal cold plate assembly 2 is fixed in the shell 1, the gas radial distribution vessel 9 is fixed in the shell 1, the radial gas cylinder 10 is fixed in the center of the gas radial distribution vessel 9, the radial gas cylinder 10 is connected with the gas outlet 6, the gas inlet 5 is connected to the cavity which is located between of the shell 1 and the gas radial distribution vessel 9. The inert filler 8 is fixed in the lower part of the internal cold plate assembly 2, and the catalyst self-discharge opening 7 which extends out of the shell 1 is connected to the lower part of the internal cold plate assembly 2. Several circles of radial baffling assemblies 12 which provide an axial baffling through groove or hole are fixed between the radial distribution vessel 9 and the radial gas cylinder 10. Referring to FIG. 8-10, the section of the radial baffling assemblies 12 employ a circle-arc structure, a polygonal line structure or a cylindrical structure. Each circle of radial baffling assemblies 12 consists of several baffling components fixed in an interval mode (The specific number can be determined after the relevant calculation as it is required). The axial baffling through groove or hole is provided between the adjacent baffling components. The baffling components employ the structure of hollow cold plates (Referring to FIGS. 6 and 8-10), or the structure consisting of the solid fixed plates 17 and the axial array tubes 18 which are inseparate from said solid fixed plates (Referring to FIG. 11), or the structure consisting of the solid fixed plates 17 and the tubes 18 which are separate from said solid fixed plates (Referring to FIG. 12). Both ends of the hollow water cooling plate (Referring to FIG. 5) are connected to the header 3 by the relevant tail tube 13. And the lower header 3 is connected to the source of cooling water by the soft water inlet tube 4, the upper header 3 is connected to the air chamber through the vapor outlet tube 14. The catalyst 11 is loaded between the radial distribution vessel 9 and the radial gas cylinder 10.

Figure 12:
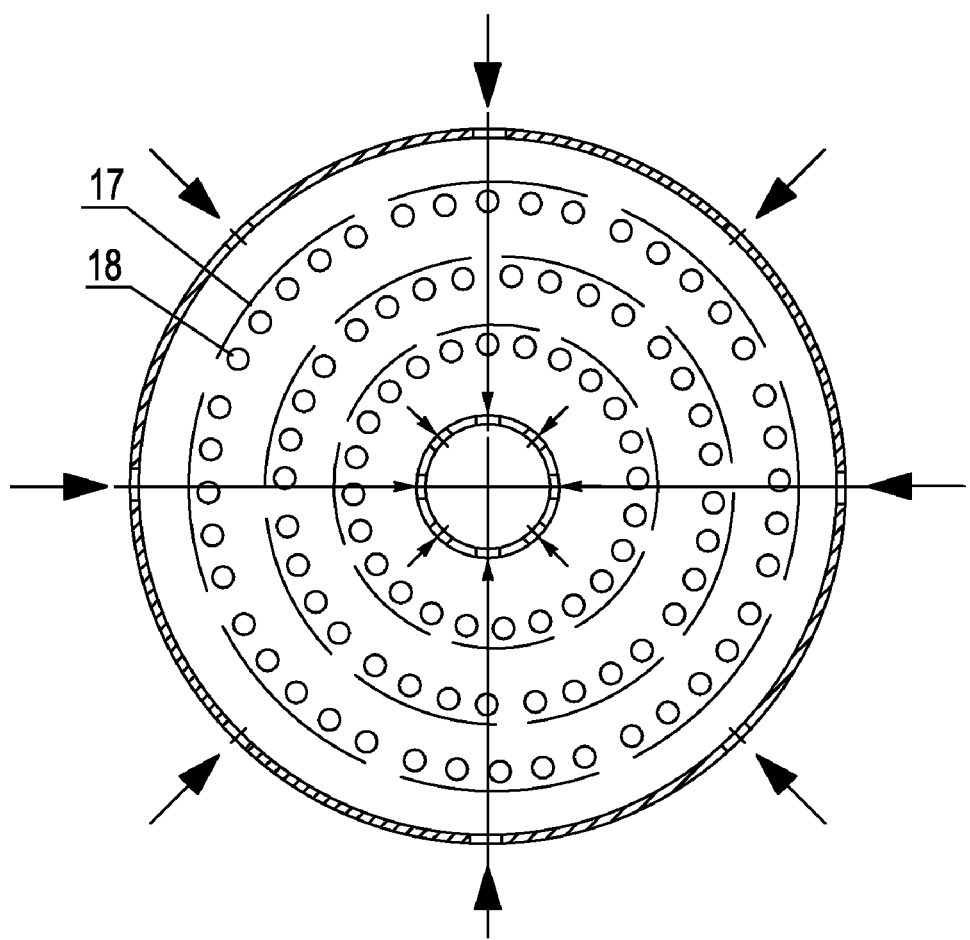
FIG. 12 is the fifth one of the abridged general views of baffle in the present utility model.

According to the need, the structure of water cooling plate may be designed as a circle-arc structure, a polygonal line structure or a cylindrical structure (Referring to FIG. 8-10), and it may be designed as the structure consisting of the solid fixed plates 17 and the axial array tubes 18 which are inseparate from said solid fixed plates (Referring to FIG. 11) or the structure consisting of the solid fixed plates 17 and the tubes 18 which are separate from said solid fixed plates (Referring to FIG. 12).

The theory and the structure of radial baffling assemblies 12 which employ the structure consisting of the solid fixed plates and the axial array tubes connected to said solid fixed plates is similar with the water cooling plate.

The present utility model is now detailed by combining with each of main components.

The basic structure of the reactor in this embodiment mostly consists of the bearing shell, the internal cold plate assembly and the air chamber.

1. Shell

Shell 1 may employ unattackable chrome molybdenum steel. And its diameter, height and thickness are designed according to the production scale and the operating pressure (The normal diameter is φ2000 mm-φ6000 mm and the normal height is 8000 mm-25000 mm). The lower end of shell 1 provides several intake pipes 4, and the catalyst is conveniently loaded from the top and downward through the upper manhole or the spherical top opened. Several self-discharge openings 7 are provided at the lower end of the shell 1, and the catalyst is automatically unloaded. A gas inlet 5 for the feed gas and a gas outlet 6 for the reacted gas are provided in the center of the spherical bottom.

2. The Internal Cold Plate Assembly

The internal cold plate assembly 2 is used to fixing the radial baffling assemblies 12, and the internal cold plate assembly 2 is an integral heat-transfer component which provides the radial distribution vessel 9 and the radial gas cylinder 10. The coolant in the cold plate may be liquid such as water, and it also maybe gas or others. It mostly employs water as an example to describe the embodiment.

3. Heat-transfer component with water-cooling baffle. It mostly comprises several pieces of baffling components with water flowing inside, the inlet and outlet connecting pipe, the upper and lower header 3, the upper and lower eduction tube 4, 14, and so on. Because the heat-transfer medium in the cold plate is coexistent with the saturated vapor, the water cooling plate is nearly a sort of isothermal heat-transfer body.

Figure 7:
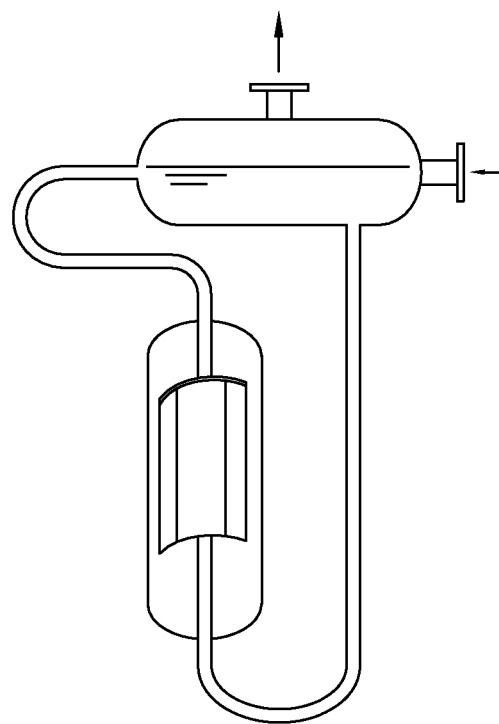
FIG. 7 is the abridged general view of the water supply device supplying for cooling water in the embodiment of the present utility model.

4. The radial baffling catalytic Bed. After the feed gas which flowed in the reactor radially flows through the radial distribution vessel 9 and into the bed, it is guided by the hollow water-cooling baffling component which is arranged into the concentric circles, and then forms baffling flow to repeatedly flow through the annular catalyst layer and make the chemical reaction while transferring heat to the cold plate. Finally it is collected by the radial gas cylinder 10 and flows out (Referring to the direction of arrow in FIGS. 5 and 6). Because the heat-transfer medium in the cold plate such as the saturated water holds the constant temperature, the saturated water is guided by the top of reactor to the upper air chamber and produces the steam incidentally, and the rest soft water forms the automatic cycle what it flows through the down pipe and returns to the lower end of the cold plate (Referring to FIG. 7). So the temperature distribution of the catalyst bed layer in the reactor is much close to the constant temperature, in order to make the whole catalyst bed layer react at the highly stable state which is approximately isothermal. And the temperature of the whole bed is controlled by the pressure of the air chamber. The arrangement and structure of the radial baffling assemblies 12 is that arrange several layers (Or cycles) along the circumference direction of the reactor. One or several hollow water cooling plates encircle and form each layer. The catalyst 11 is loaded between the plates. The vent opening is provided at the joint of each cold plate in the same circle, and the vent openings of the cold plates which are located in its neighboring internal cycle and its neighboring outer cycle is stagger with each other, in order to form the gas of the catalyst layer to the baffling (Referring to FIG. 6). The water outlet and the water inlet are provided in the upper end and the lower end of each cold plates, which are connected with the tubes of the header by using the curving tail tube 13. The tube of the header provides a water header pipe which provides the connection of the rising pipe and the down pipe of the air chamber. The arrangement of the water cooling plates is designed by the designer according to the heat output of the catalytic reaction which is determined by the production capacity, heat quantity transferred by the cold plates, the resistance of the bed, and so on. Finally determine the overall size of the reactor and the arrangement of cold plates, which comprises the heat-transfer area of the cold plate, the number of the cold plate in each cycle, the number of the baffling flow, the spacing of the cold plate, the length of the cold plate, the size of the cold plate water passages, and so on. The section of the water cooling plate may be several types, such as the polygonal line structure (Referring to FIG. 8), the circle-arc structure (Referring to FIG. 9), the cylindrical structure (Referring to FIG. 10), and so on. But whichever type it is, the water cooling plate forms the baffling flow. Designers choose any type of the cold plate structures according to their analyzing of the advantages and the disadvantages. When employing the baffling components in the FIGS. 11 and 12, it may also employ the section equivalent to the section in the FIG. 8-10.

The object of the radial flow distributor in this embodiment is to reduce the bed fluid resistance. The radial bed consists of the distribution vessel and the gas cylinder, which are fixed in the inner or the outer according to the flow direction (Entoectad or ecto-entad).

The difference of the radial flow distributor in the present utility model and the presently known radial reactor is the opening's position of the distribution vessel and the gas cylinder. The opening's position of the distribution vessel and the gas cylinder in the present utility model is fixed in the position opposite to the centerline of the water cooling plate, in order to make the flow which flows in or out form the baffling flow.

What is claimed is:

1. A shell-type reactor with radial baffles comprising:
    a shell (1) and an internal cold plate assembly (2) fixed within said shell (1);
    a gas radial distribution vessel (9) and a radial gas cylinder (10) fixed within said shell (1);
    said radial distribution vessel (9) and said radial gas cylinder (10) may counterchange according to the difference of the gas flow direction;
    several circles of radial baffling assembly (12) with a cylindrical structure being provided between said radial distribution vessel (9) and said radial gas cylinder (10);
    Said radial baffling assembly with cylindrical structure including several coaxial cylindrical baffling components having through holes or grooves distributed on their column faces.

2. The shell-type reactor with radial baffles of claim 1, wherein said baffling components possess a structure of hollow cold plates, or a structure of a solid fixed plates with attached axial array tubes, or a structure of a solid fixed plates with separated tubes.

3. The shell-type reactor with radial baffles of claim 2, wherein said baffling component has hollow cavity, in which is full of water or other coolants.

4. The shell-type reactor with radial baffles of claim 1, wherein plurality of radial through holes are distributed on the surfaces of said radial distribution vessel (9) and said radial gas cylinder (10), said radial through holes are staggered with said axial baffling through groove or said axial baffling through hole.

5. The shell-type reactor with radial baffles of claim 1, wherein the through holes or grooves distributed on two adjacent cylindrical baffling components are staggered.

* * * * *